(12) United States Patent
Alts

(10) Patent No.: US 6,569,509 B1
(45) Date of Patent: May 27, 2003

(54) ULTRALIGHT, SOUND AND SHOCK ABSORBING COMPONENT SET

(75) Inventor: Thorsten Alts, Gross-Bieberau (DE)

(73) Assignee: Rieter Automotive (International) AG, Zollikon (CH)

(*) Notice: Subject to any disclaimer, the term of this patent is extended or adjusted under 35 U.S.C. 154(b) by 0 days.

(21) Appl. No.: 09/582,921

(22) PCT Filed: Jan. 6, 1999

(86) PCT No.: PCT/CH99/00005
§ 371 (c)(1),
(2), (4) Date: Jul. 7, 2000

(87) PCT Pub. No.: WO99/35007
PCT Pub. Date: Jul. 15, 1999

(30) Foreign Application Priority Data

Jan. 9, 1998 (CH) .............................................. 0034/98

(51) Int. Cl.[7] .............................................. B32B 3/00
(52) U.S. Cl. ........................ 428/73; 428/116; 428/593; 428/131; 181/284; 181/285; 181/286; 181/288; 181/290; 181/291; 181/292; 181/294
(58) Field of Search ........................ 428/116–118, 73, 428/593, 131; 181/284, 286, 288, 290, 292, 291, 285, 294

(56) References Cited

U.S. PATENT DOCUMENTS 5,543,198 A * 8/1996 Wilson

FOREIGN PATENT DOCUMENTS

| DE | 19627106 | * | 3/1997 |
| DE | 29607262 | * | 8/1997 |
| EP | 0352993 | * | 1/1990 |
| EP | 0787578 | * | 8/1997 |
| FR | 2727189 | * | 5/1996 |
| JP | 61249853 | * | 11/1986 |
| WO | 9212855 | * | 8/1992 |
| WO | WO 98/18657 | * | 5/1998 |

* cited by examiner

Primary Examiner—Deborah Jones
Assistant Examiner—Wendy Boss
(74) Attorney, Agent, or Firm—Nath & Associates PLLC; Gary M. Nath; Marvin C. Berkowitz

(57) ABSTRACT

The invention relates to an ultralight, sound and shock absorbing component set comprising at least one base layer (2), an intermediate layer (3) and a covering layer (6). The intermediate layer (3) consists of a plurality of hollow bodies (4) arranged next to each other, whose walls are perforated and which thus form a complex labyrinth of hollow spaces. The covering layer (6) preferably has a microporous stiffening layer (8) which generates an airflow resistance of 900 Ns/m$^3$<$R_r$<2000 Ns/m$^3$. The dimensions of the walls of the hollow bodies (4) are such that they allow for compression of at least 50% at a maximum plateau tension of 0.5 Mpa<σ<1.2 Mpa and inelastically and fully convert an impact energy of approximately 0.5 MJ/m$^3$ into deformation work.

Figure 1:
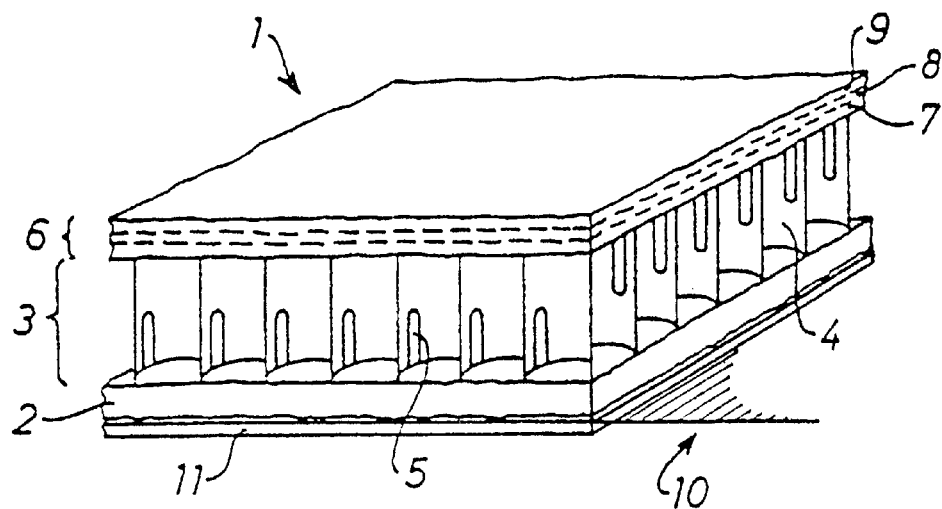

22 Claims, 3 Drawing Sheets ated hollow articles, whose walls are substantially per-
ULTRALIGHT, SOUND AND SHOCK ABSORBING COMPONENT SET The present invention relates to an ultralight sound- and shock-absorbing component set for motor vehicles according to the precharacterising clause of claim 1 and component therefor.

Large-area vehicle parts, such as floor panels, roof panels, engine bonnet, boot lid or doors and side panels, tend, because of their low level of inherent strength, to become deformed, vibrate and oscillate during travel. This behaviour is conventionally countered by the application of damping materials, in particular heavy bituminous coatings. To reduce the transmission of travel noise to the inside of a vehicle, multi-layer sound-insulation assemblies have long been used in the automobile industry. These sound-insulation assemblies are generally designed as spring/weight systems and all comprise a heavy layer coupled with a resilient spring layer, in order to damp the vibrations suffered by the large-area bodywork parts and to restrain the passage of airborne noise.

Such a sound-insulation assembly is described, for example, in EP-0,334,178 and substantially comprises a flexible foam layer facing the bodywork part with a tendency to vibrate, which layer acts as the spring of the spring/weight system, a virtually compact, air-impermeable layer of the same material acting as the weight of the spring/weight system and a decorative or carpet layer arranged thereon. With this construction, the weight of the heavy layer may be reduced by up to 40% and the weight of the entire sound insulation system may thus also be reduced relative to the known spring/weight systems, albeit with diminished acoustic efficacy. In general, spring/weight arrangements always lead to resonant incursions in the sound insulation, which regularly lie in the range of frequencies of the same order of magnitude as the lower engine frequencies and are particularly undesirable in this range. This phenomenon thus fundamentally prevents an extremely light construction.

However, the general desire of the automobile industry is further to reduce vehicle weight and in particular the weight of internal trim. It was therefore proposed in PCT/CH 96/00381 to provide a sound-insulating component which is more than 50% lighter than conventional sound-insulation assemblies. The structure of this component differs from the above-described insulation assemblies in that the heavy layer of the conventional spring/weight systems is replaced by a light-weight, relatively thin, microporous, rigid fibre layer and particular attention is paid to the flow behaviour of the air in the boundary area between the bodywork part and the fitting assembly. Thus, the relatively heavy-weight damping mechanism of the conventional spring/weight systems is reduced fundamentally in favour of a light-weight, efficient sound-absorption capacity.

It is a further desire of the automobile industry also to equip the interior of vehicles with shock-absorbing means, to protect the passengers as far as possible from serious injuries in the event of a vehicle collision. To this end, passenger compartments are currently equipped with a shock-absorbing lining. Such linings as a rule comprise a more or less expensive carpet layer, which is backed with a shock-absorbing layer. These shock-absorbing internal linings are suitable for absorbing completely impact energy of 90 Joules and impulses of less than 400 daN. These linings also take the form of spring/weight systems and exhibit the known disadvantages thereof. Furthermore, these combined shock- and sound-absorbing linings are undesirably thick. It has therefore also already been proposed, in CH 1415/96, to provide a thin lining part with improved sound- and shock-absorbing properties. This system also behaves substantially as a spring/weight system and additionally makes use of dissipative mechanisms in the boundary area between bodywork part and insulation component.

Sound-absorbing components are also known from U.S. Pat. No. 4,479,992, which are not designed as spring/weight systems. These components comprise an alveolate structure, which is covered with at least one open-cell nonwoven. These components are relatively bulky and are easily deformed, i.e. are not suitable as shock-absorbers.

It is the object of the present invention to provide a lining component for vehicle interiors which combines the properties of conventional sound-insulation and shock-absorbers without being, as a result, heavier and bulkier than these. It is in particular the object of the present invention to provide a thin, ultralight, sound- and shock-absorbing lining component.

This is achieved according to the invention by a fitting assembly having the features of claim 1 and in particular by a multi-layer fitting assembly without heavy layer, wherein one of the layers comprises a plurality of adjacently arranged hollow articles, whose walls are substantially perpendicular to the fitting surface and laterally perforated, preferably at least partially slotted, in such a way that a cohesive labyrinth of cavities is formed thereby.

With such a labyrinth of cavities, it is possible on the one hand to improve substantially the acoustic absorption capacity or to reduce the overall thickness of the fitting assembly relative to conventional system without losing acoustic absorption capacity. On the other hand, the walls of the hollow articles arranged substantially perpendicularly to the fitting surface exhibit particularly advantageous compression behaviour. If a body impacts against the fitting assembly, these impact forces compress the walls positioned substantially in the impact direction, or these walls buckle or break.

It goes without saying that the person skilled in the art may produce the desired compression behaviour by a suitable choice and dimensioning of the material. For the present application, plateau-type compression behaviour is desirable.

In a preferred embodiment, therefore, the walls of the hollow articles are dimensioned in such a way that they permit compression of at least 50% under a maximum plateau tension of 0.5 MPa<$\Phi$<1.2 MPa and convert an impact energy of approx. 0.5 MJ/m$^3$ inelastically and completely into deformation.

In a further embodiment, this fitting assembly comprises a microporous stiffening layer, which exhibits total air flow resistance of 900 Ns/m$^3$<$R_t$<2000 Ns/m$^3$, flexural strength of 0.027 Nm<B<0.275 Nm and a weight per unit area of 0.3 kg/m$^2$<$m_F$<0.7 kg/m$^2$.

Such an extremely light stiffening layer is important for the acoustic efficacy of the fitting assembly. The air flow resistance has a substantial influence on the absorption behaviour of this layer and may be determined by the selection of a suitable open-cell structure (nonwoven fabric or foam). The relatively high flexural strength of this layer is significant for the low-frequency range and may contribute considerably to the fact that the entire fitting assembly is self-supporting.

Further embodiments of the component set according to the invention and the particular technical features thereof are revealed by the subclaims.

The advantages of this acoustically effective shock-absorber arrangement are directly obvious to the person skilled in the art and are to be found, in particular, in the fact that the structure lacks a heavy layer, i.e. is ultralight and thin.

Figure 2:
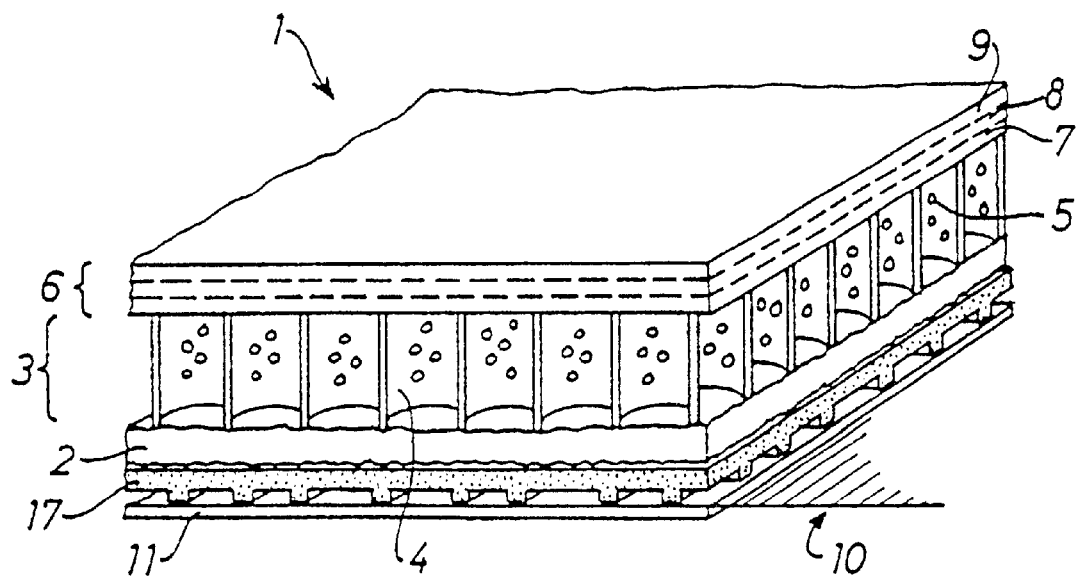
Figure 3A:
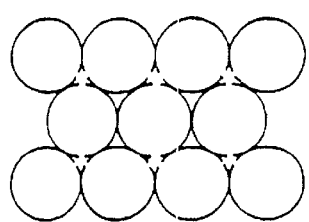
Figure 3D:
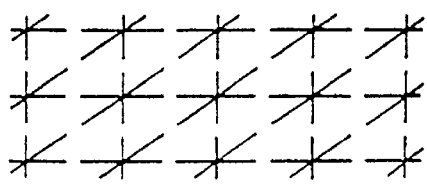
Figure 3C:
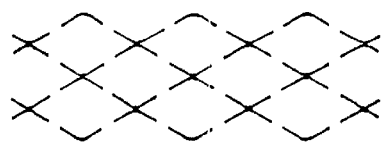
Figure 3B:
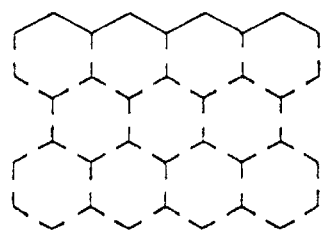
Figure 4:
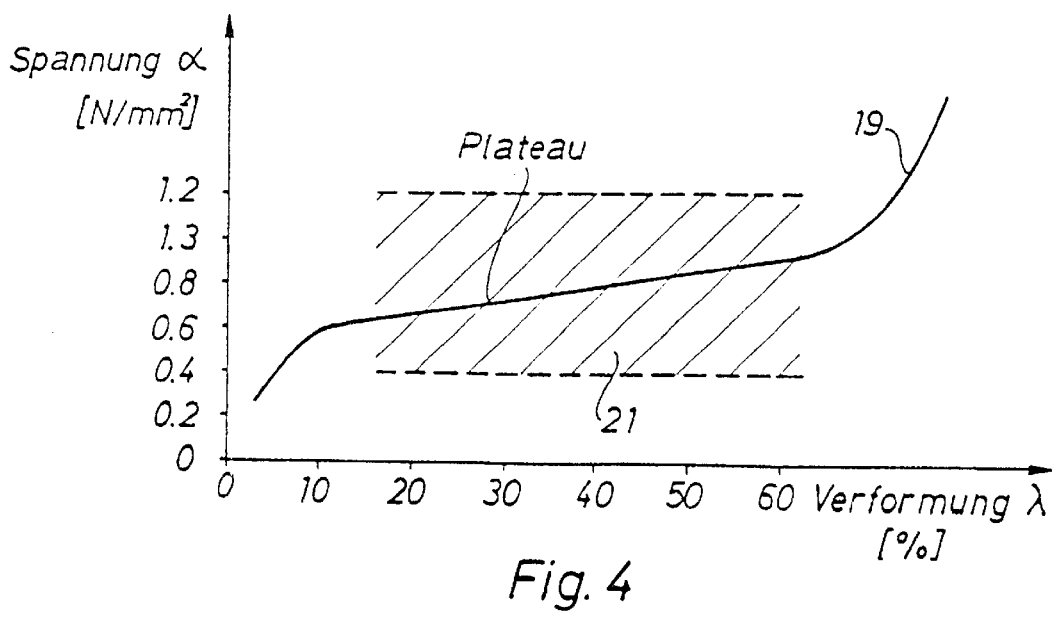
Figure 5:
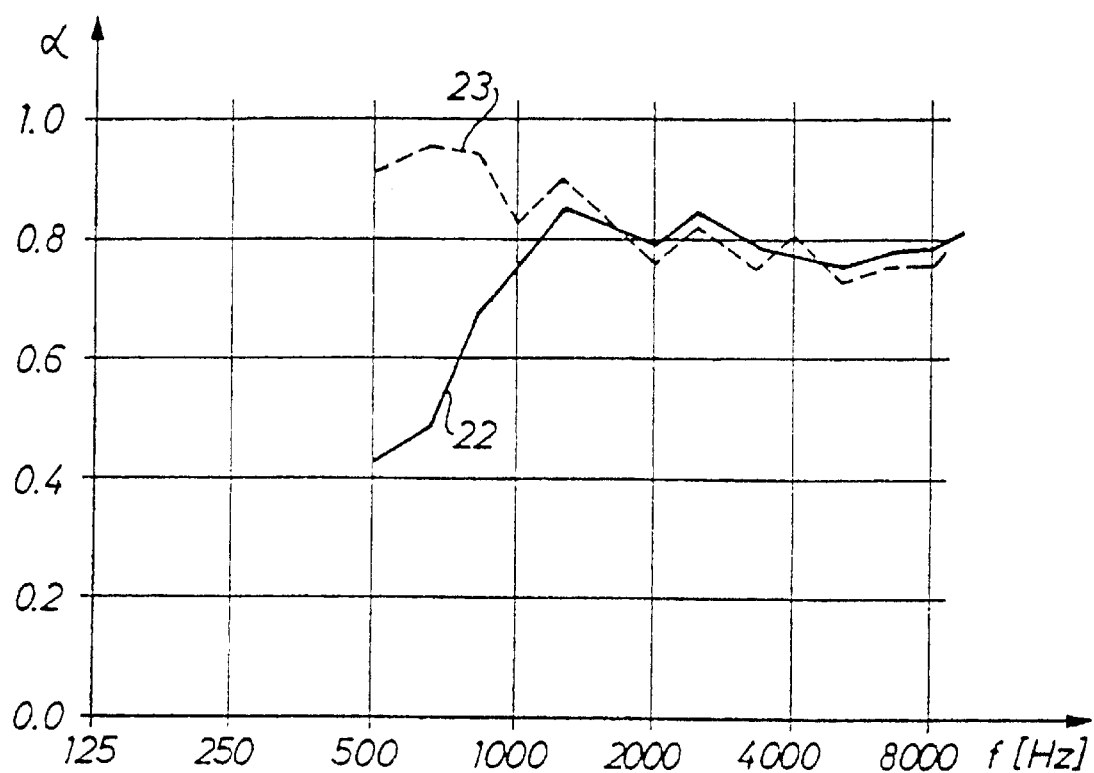

The invention is described in more detail below with reference to a number of exemplary embodiments and with the aid of the Figures, in which:

FIG. 1: is a schematic representation of the fitting assembly and component set according to the invention;

FIG. 2: is a schematic representation of a further development of the fitting assembly and component set according to the invention;

FIG. 3a: is a schematic representation of a cross section through a preferred embodiment of the intermediate layer of the fitting assembly according to the invention;

FIG. 3b: is a schematic representation of a cross section through an alveolate embodiment of the intermediate layer of the fitting assembly according to the invention;

FIG. 3c: is a schematic representation of a cross section through a rhomboidal embodiment of the intermediate layer of the fitting assembly according to the invention;

FIG. 3d: is a schematic representation of a cross section through a prismatic embodiment of the intermediate layer of the fitting assembly according to the invention;

FIG. 4: shows the measurement curve relating to the compression behaviour of the fitting assembly according to the invention;

FIG. 5: shows the measurement curve relating to the absorption behaviour of the fitting assembly according to the invention.

The structure of the fitting assembly and the manner of operation of the component set claimed will be described in more detail with reference to FIG. 1. The fitting assembly 1 shown in FIG. 1 comprises a base layer 2, which preferably consists of a porous nonwoven, in particular a porous polypropylene nonwoven. An intermediate layer 3 is constructed of a plurality of tubular elements 4, the walls of which are at least partially slotted, in such a way that the cavities of the individual tubular elements 4 are connected together via these slot-type openings 5 and thereby form a cohesive labyrinth of cavities. It is essential for the present invention that the walls of these tubular elements 4 are substantially perpendicular to the fitting surface 10, i.e. are positioned in the direction of an expected impact. These tubular elements 4 may also be made of a thermoplastic, in particular a polyethylene, and exhibit a diameter of 5–12 mm and a height of 5–40 mm; and, in a preferred embodiment, a diameter of 5–12 mm and a height of 10–25 mm. The wall thickness of these tubular elements 4 is such that the requirements of a shock-absorbing element in the vehicle sector are fulfilled, i.e. this intermediate layer 3 may convert an impact energy of approx. 90 Joules completely into deformation effort. In a preferred embodiment, these tubes are made of polyethylene and fused together in the upper or lower edge area. It goes without saying that these tubes may also be made of other suitable materials, for example of polypropylene, of flameproof paper, aramid, kevlar or aluminium. A covering layer 6 is positioned on this intermediate layer 3, which former may also be made of a polypropylene nonwoven. This covering layer 6 may also take the form of a plurality of different types of layers, and in particular a more highly compacted nonwoven layer 7 of polypropylene for example, a rigid microporous layer 8 and a decorative layer 9.

This microporous layer 8 is essential for achieving optimum sound absorption and takes the form of a microporous stiffening layer. In contrast to conventional covering layers, the present microporous stiffening layer creates an air flow resistance of 900 Ns/m$^3$<$R_t$<2000 Ns/m$^3$, and in particular of $R_t$·1500 Ns/m$^3$, and thus results in 60 to 80% absorption for frequencies above 250 Hz. In comparison, it should here be noted that air-permeable carpets conventionally used in automobile construction have an air flow resistance of $R_t$·200 Ns/m$^3$. As a rule, however, to improve sound insulation these carpets are backed with an air-impermeable film or foam layer, whereby effective sound absorption by the lower layers is prevented. The present microporous stiffening layer additionally preferably exhibits flexural strength of 0.027 Nm<B<0.275 Nm and a weight per unit area of 0.3 kg/m$^2$<$m_F$<0.7 kg/m$^2$.

For noise reduction and shock-absorbing purposes, this fitting assembly 1 is applied to, preferably merely laid on, a vehicle bodywork part 11. The bodywork part 11 is an advanced composite laminate, an aluminium sheet or a plastics part, in particular of GMT. In a preferred embodiment, the base layer 2 is shaped in the manner of a relief on the side facing the bodywork part 11. The variations in air pressure and air currents created by the vibrating and oscillating bodywork part 11 are substantially absorbed or cancelled out in the intermediate layer 3. In particular, the labyrinth of cavities produced with the intermediate layer 3 ensures that the locally varying strong air currents are compensated and dissipated. An additional sound-absorbing function is exerted by the relief-type base layer 2, the locally varying, strong, directional air currents being guided through the area between the bodywork part 11 and the base layer 2.

The fitting assembly 1 according to the invention differs from known sound-absorbing insulation assemblies through the use of a rigid but air-permeable intermediate layer 3, which is so constructed that the air vibrations produced by the sound field are guided through a labyrinth of cavities.

The embodiment of the fitting assembly 1 according to the invention illustrated in FIG. 2 again comprises an intermediate layer 3, which is arranged between a base layer 2 and a covering layer 6. In this embodiment, the tubular elements 4 comprise perforations 5 in the form of holes and the walls of these elements 4 are positioned substantially perpendicularly to the fitting surface 10. These perforations 5 ensure the creation of a cohesive labyrinth of cavities in the intermediate layer 3. In this exemplary embodiment, the entire fitting assembly 1 is connected with a damping layer 17, which is in turn positioned on the bodywork part 11. In preferred embodiments, the damping layer 17 is an EPDM layer and is textured on the bodywork part side and positioned only loosely thereon. In a further embodiment, this damping layer 17 is connected firmly to the bodywork part 11 and the base layer 2 of the fitting assembly 1 lies loosely on the damping layer 17. In this embodiment, either the base layer 2 may be textured on the damping layer side or the damping layer 17 may be textured on the base layer side, in order to create a cohesive air layer between these two layers 2, 17. It goes without saying that in the simplest embodiment these layers 2, 17 may be connected firmly together, for example adhered. As in the exemplary embodiment according to FIG. 1, the covering layer 6 may again comprise several layers, preferably a decorative layer 9, a microporous layer 8 and a compacted nonwoven layer 7.

FIG. 3a shows a cross section through an intermediate layer 3 according to the invention, which is constructed from a plurality of cylindrical elements 4. These elements 4 are preferably made of polypropylene and fused together at their upper or lower edges. In this way, a rigid, self-supporting layer is produced, which ensures that the entire fitting assembly 1 retains its shape under its own weight. The perforations 5 in this intermediate layer 3 may be of slot-type construction and extend over the entire height of the cylindrical elements 4. It goes without saying that, instead of such slots, perforations of different shapes may also be provided, in particular in the form of a plurality of holes. According to the invention, the perforations 5 are arranged in such a way that the individual tubular cavities 12 and the spaces are connected together in the manner of a labyrinth.

FIG. 3*b* shows an alveolate-textured structure of the intermediate layer 3. In this construction too, the walls 13 of the individual alveolate portions are perforated and the chambers 14 form a cohesive labyrinth of cavities. In this embodiment too, the walls are dimensioned in such a way that the entire fitting assembly meets the requirements of a shock-absorbing vehicle lining.

FIG. 3*c* shows an intermediate layer 3 with rhomboidal cells 15, which are connected together by means of openings 16. It goes without saying that the person skilled in the art may consider other intermediate layers constructed of a plurality of chambers, in order to produce a rigid, shock-absorbing layer which is also made acoustically effective by suitable perforations. In particular, the person skilled in the art may also consider an intermediate layer 3 with prismatic cells 18, as illustrated in FIG. 3*d*, and select the most advantageous arrangement for the respective application.

The measurement curve 19 illustrated in FIG. 4 shows the compression behaviour of the fitting assembly according to the invention upon compression. The percentage deformation is plotted on the x-axis, while the tension exerted in $N/mm^2$ is plotted on the y-axis. It is clear from the profile shown of the measurement curve 19 that, in the event of low tension values below $0.5\ N/mm^2$, no substantial deformation of the fitting assembly 1 and in particular of the intermediate layer 3 occurs. With these values, the individual tubes may yield resiliently under the tension exerted and any deformation which may arise is completely reversed. Above these tension values, the individual tubes begin to buckle and/or break. In this plateau range, therefore, the substantial proportion of the impact energy is converted into deformation and the tension remains substantially constant. The person skilled in the art of automobile construction knows shock absorbers which exhibit corresponding compression behaviour and is easily in a position to dimension an intermediate layer 3 so it exhibits the required behaviour. In particular, he/she knows the minimum requirements of shock-absorbing components and will ensure that the compression behaviour lies within the set tolerance zones 21.

The measurement curves illustrated in FIG. 5 show the acoustic absorption behaviour of different embodiments of the component set according to the invention. Thus, the curve 22 shows the profile of the frequency-dependent absorption for a fitting assembly with an intermediate layer of plastics tubes approximately 10.5 mm high, exhibiting a weight per unit area of approx. $730\ g/m^2$, a microporous stiffening layer, in particular a highly compacted nonwoven layer approx. 1.4 mm thick, exhibiting a weight per unit area of approx. $700\ g/m^2$ and a decorative layer exhibiting a weight per unit area of approx. $240\ g/m^2$. In this embodiment, it is clear that the absorption coefficient ∀ for frequencies of above 1000 Hz is approximately 0.8, while the absorption coefficient for frequencies of below 1000 Hz falls away continuously and at approx. 500 Hz exhibits a value of 0.4.

The measurement curve 23 illustrated in the same FIG. 5 shows the frequency-dependent absorption behaviour of a fitting assembly positioned directly on the floor and having an intermediate layer of plastics tubes approximately 21 mm thick and a weight per unit area of $1240\ g/m^2$. This fitting assembly again comprises a highly compacted nonwoven approximately 1.4 mm thick, exhibiting a weight per unit area of approx. $700\ g/m^2$, and a finish exhibiting a weight per unit area of approx. $240\ g/m^2$. In this embodiment too, the absorption coefficient for frequencies above 1000 Hz is approx. 0.8. A marked improvement in absorption behaviour may be noted in the range below 1000 Hz.

This fitting assembly may be used anywhere where shock- and sound-absorbing properties are required, in particular, therefore, in heavy goods vehicles and private cars, in order to provide the upper area of the outer front panel therewith.

It goes without saying that this fitting assembly has a stiffening effect when stuck on and may therefore also be applied to other vehicle parts. In particular, therefore, it may be used for lining the passenger compartment, the engine and luggage spaces, on the A-, B- or C-pillars, the vehicle roof, in the crash-sensitive part of the foot space, in the door side panels, in the boot, in the area of the spare wheel cover, in the area of the inner and outer front panel, as an underbody of space frame vehicles, etc. This additional stiffening ensures that the undesirable resonance incursions affecting the sound insulation are lowered in frequency range.

Depending on the use to which it is to be put, the hollow article structure of this fitting assembly may also be made of heat-resistant paper, kevlar, aramid or aluminium. In particular, this fitting assembly may be used in space frame vehicles.

What is claimed is:

1. A self-supporting fitting assembly without a heavy layer for a sound- and shock-absorbing vehicle lining, having at least one base layer, an intermediate layer and a covering layer, the intermediate layer comprising a plurality of adjacently arranged hollow articles, having walls substantially perpendicular to a fitting surface, characterised in that the walls of the hollow articles are laterally perforated in such a way that a cohesive labyrinth of cavities is formed thereby and the walls of the hollow articles are dimensioned in such a way that they permit compression of at least 50% under a maximum plateau tension of $0.5\ MPa<\phi<1.2\ MPa$ and convert an impact energy of approx. $0.5\ MJ/m^3$ inelastically and completely into deformation; and further comprising a microporous stiffening layer, which exhibits total air flow resistance of $900\ Ns/m^3<R_r<2000\ Ns/m^3$, flexural strength of $0.027\ Nm<B<0.275\ Nm$ and a weight per unit area of $0.3\ kg/m^2<m_F<0.7\ kg/m^2$.

2. A fitting assembly according to claim 1, characterised in that the intermediate layer comprises a cavity structure consisting of a plurality of adjacently arranged tubes with a diameter of from 5 to 12 mm and a height of from 5 to 40 mm.

3. A fitting assembly according to claim 1, characterised in that the intermediate layer comprises an alveolate.

4. A fitting assembly according to claim 2, characterised in that the cavity structure is made of a plastics material.

5. A fitting assembly according to claim 4, characterised in that the hollow articles of the cavity structure are fused together at least at the ends.

6. A fitting assembly according to claim 2, characterised in that the intermediate layer is made of paper, of poly(p-phenyleneterephtalamide) [kevlar], aramid or aluminium.

7. A fitting assembly according to claim 1, characterised in that the base layer comprises a porous PP nonwoven, PE nonwoven or composite nonwoven of chemical and natural fibres.

8. A fitting assembly according to claim 1, further comprising a damping layer.

9. An ultralight component set for noise reduction and shock absorption in vehicles, in which at least one large-area bodywork part and a fitting assembly having the features of claim 1 cooperate with one another, wherein a cohesive layer of air is formed between this fitting assembly and the large-area bodywork part.

10. A component set according to claim 9, characterised in that a damping layer is arranged between the fitting assembly and the large-area bodywork part.

11. A component set according to claim 10, characterised in that the damping layer is shaped in the manner of a relief, in such a way that it lies only partially against the large-area bodywork part and forms the cohesive layer of air between the large-area bodywork part and the damping layer.

12. An ultralight component set for noise reduction and shock absorption in vehicles, in which at least one large-area bodywork part and a fitting assembly having the features of claim 1 are connected firmly together.

13. A component set according to claim 12, characterised in that the large-area bodywork part is an advanced composite laminate, an aluminium sheet or a plastics part.

14. A vehicle component comprising the fitting assembly according to claim 1, wherein said component is adapted to be installed in a vehicle space including: a passenger space, an engine space, a luggage space, in a crash-sensitive part of a foot space, in a door side panel, in a boot, in a spare wheel cover, in an inner and outer front panel, in an engine bonnet, in a heavy goods vehicle rear panel, as an underbody in space frame vehicles, and in a vehicle roof.

15. A component set comprising the component set according to claim 10, wherein said component set is adapted to be installed in a vehicle space including: in a crash-sensitive part of a foot space, in a door lining, in a boot space, in a spare wheel cover, in an inner and outer front panel, in an engine bonnet, in a heavy goods vehicle rear panel, and as an underbody in space frame vehicles.

16. The fitting assembly according to claim 1 wherein said hollow articles are partially slotted.

17. The fitting assembly according to claim 3 wherein said alveolate comprises a honeycomb, a rhomboidal or a prismatic cavity structure.

18. The fitting assembly according to claim 4 wherein said plastic material comprises a thermoplastic.

19. The fitting assembly according to claim 18 wherein said thermoplastic comprises PP or PE.

20. The fitting assembly according to claim 6 wherein said paper comprises a heat-resistant paper.

21. The component set according to claim 13 wherein said plastics part comprises GMT.

22. The vehicle component according to claim 14 wherein the passenger space comprises A-, B- and C-pillars.

* * * * *